(12) United States Patent
Alsup et al.

(10) Patent No.: US 7,315,935 B1
(45) Date of Patent: Jan. 1, 2008

(54) APPARATUS AND METHOD FOR PORT ARBITRATION IN A REGISTER FILE ON THE BASIS OF FUNCTIONAL UNIT ISSUE SLOTS

(75) Inventors: Mitchell Alsup, Austin, TX (US); Brian D. McMinn, Buda, TX (US); Benjamin T. Sander, Austin, TX (US); David E. Kroesche, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 540 days.

(21) Appl. No.: 10/679,745

(22) Filed: Oct. 6, 2003

(51) Int. Cl.
*G06F 9/30* (2006.01)
*G06F 9/40* (2006.01)
*G06F 15/00* (2006.01)

(52) U.S. Cl. ....................... 712/214
(58) Field of Classification Search ............... 712/214
See application file for complete search history.

(56) References Cited

U.S. PATENT DOCUMENTS

| 5,129,067 A | 7/1992 | Johnson |
| 5,805,906 A | 9/1998 | Cheong et al. |
| 5,918,065 A * | 6/1999 | Ando ........................ 712/42 |
| 6,076,154 A * | 6/2000 | Van Eijndhoven et al. ... 712/24 |
| 6,175,912 B1 | 1/2001 | Alidina et al. |
| 2004/0064679 A1* | 4/2004 | Black et al. ............... 712/214 |

* cited by examiner

*Primary Examiner*—Eddie Chan
*Assistant Examiner*—Brian P Johnson
(74) *Attorney, Agent, or Firm*—Meyertons Hood Kivlin Kowert & Goetzel, P.C.; B. Noël Kivlin; Stephen J Curran

(57) ABSTRACT

A microprocessor is configured to provide port arbitration in a register file. The microprocessor includes a plurality of functional units configured to collectively operate on a maximum number of operands in a given execution cycle, and a register file providing a number of read ports that is insufficient to provide the maximum number of operands to the plurality of functional units in the given execution cycle. The microprocessor also includes an arbitration logic coupled to allocate the read ports of the register file for use by selected functional units during the given execution cycle.

23 Claims, 8 Drawing Sheets

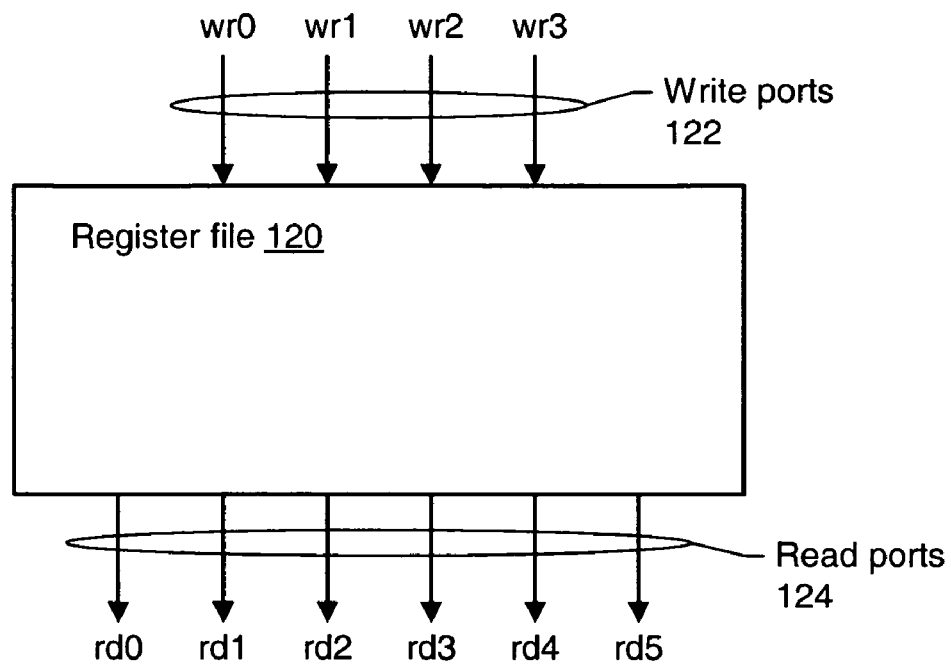
FIG. 2
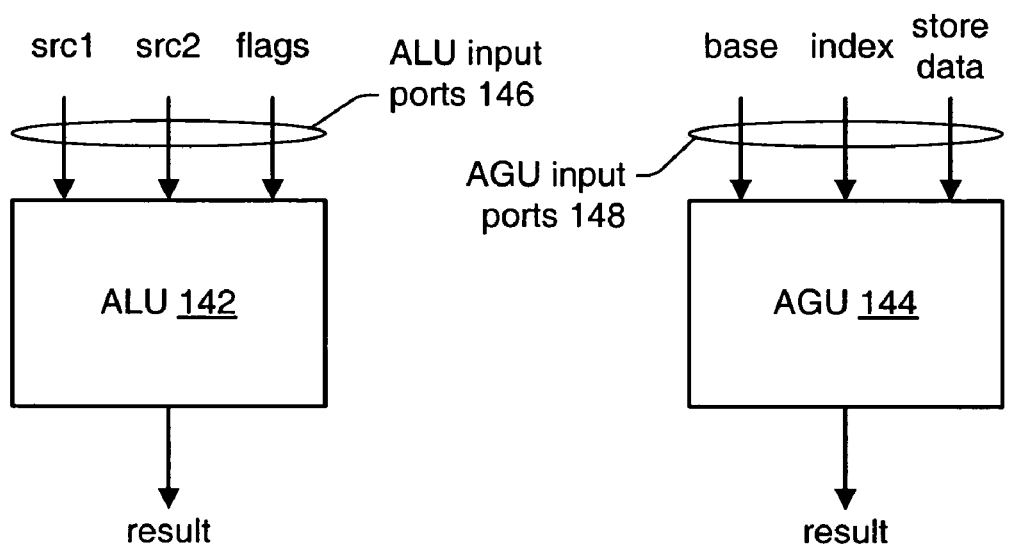
FIG. 3
FIG. 4

APPARATUS AND METHOD FOR PORT ARBITRATION IN A REGISTER FILE ON THE BASIS OF FUNCTIONAL UNIT ISSUE SLOTS

BACKGROUND OF THE INVENTION

1. Field of the Invention

This invention relates to microprocessors employing register files and, more particularly, to arbitration of register file ports.

2. Description of the Related Art

In the course of executing a software program on a conventional microprocessor, instructions and data are retrieved from a system memory to be used in the execution of individual microprocessor instructions or operations. However, system memory bandwidth is generally insufficient to directly provide instructions and data to a microprocessor at the rate at which it can consume them. To improve execution performance, modern microprocessors integrate a register file into the microprocessor core. Register files typically provide a plurality of addressable locations that can be quickly decoded by the microprocessor's control logic; such locations serve as rapidly accessible storage from which to retrieve operands for the execution of operations and to which to store operation results. Register files provide operands to functional units by accessing specific locations through a plurality of read ports. Results are written to specific locations through a plurality of write ports. Typically, any given register file location can be read from any given read port and written by any given write port.

To further improve microprocessor performance, the number of operations that can be performed simultaneously may be increased by including a plurality of functional units that may execute operations in parallel. Such superscalar microprocessors may include multiple integer and floating point functional units including, for example, arithmetic logic units, address generation units, branch processing units, multipliers and dividers.

Increasing the number of functional units in a microprocessor implementation directly increases the number of operations that can be simultaneously performed. However, realizing maximum functional unit utilization requires the register file to provide sufficient read and write ports to simultaneously provide each functional unit with operands and to store execution results.

Accordingly, as the number of functional units in a microprocessor implementation increases, the number of register file read and write ports that supply operands may necessarily increase. However, increasing the number of read and write ports greatly increases the complexity of designing and implementing the register file. Each additional read or write port requires additional control logic to decode and select which location to access via that port. Further, each such additional port requires a separate wire bus connected to each register file location, if access symmetry (i.e., any location being readable or writeable by any port) is to be maintained. Depending on the manufacturing process used to manufacture the microprocessor, additional wiring may require a larger physical register file layout, resulting in slower register file performance due to electrical factors such as increased capacitive loading and signal transit time.

The performance costs of adding read or write ports may ultimately outweigh the performance benefits of increasing parallelism through adding functional units. Not providing sufficient read and write ports to simultaneously supply all functional units also limits performance. Thus, it may be desirable to have a processor design including an optimized number of register file read and write ports in a given implementation.

SUMMARY OF THE INVENTION

Various embodiments of a microprocessor configured to provide port arbitration in a register file are disclosed. In one embodiment, the microprocessor includes a plurality of functional units configured to collectively operate on a maximum number of operands in a given execution cycle, and a register file providing a number of read ports that is insufficient to provide the maximum number of operands to the plurality of functional units in the given execution cycle. The microprocessor also includes an arbitration logic coupled to allocate the read ports of the register file for use by selected functional units during the given execution cycle.

In one specific implementation, each of the plurality of functional units corresponds to one of a plurality of issue slots. In another specific implementation, the arbitration logic is further configured to allocate a first portion of the read ports to a first portion of the plurality of functional units that corresponds to a first issue slot.

BRIEF DESCRIPTION OF THE DRAWINGS

FIG. 2 is a block diagram illustrating one embodiment of a register file.

FIG. 3 is a block diagram illustrating one embodiment of an arithmetic logic unit (ALU).

FIG. 4 is a block diagram illustrating one embodiment of an address generation unit (AGU).

Figure 1:
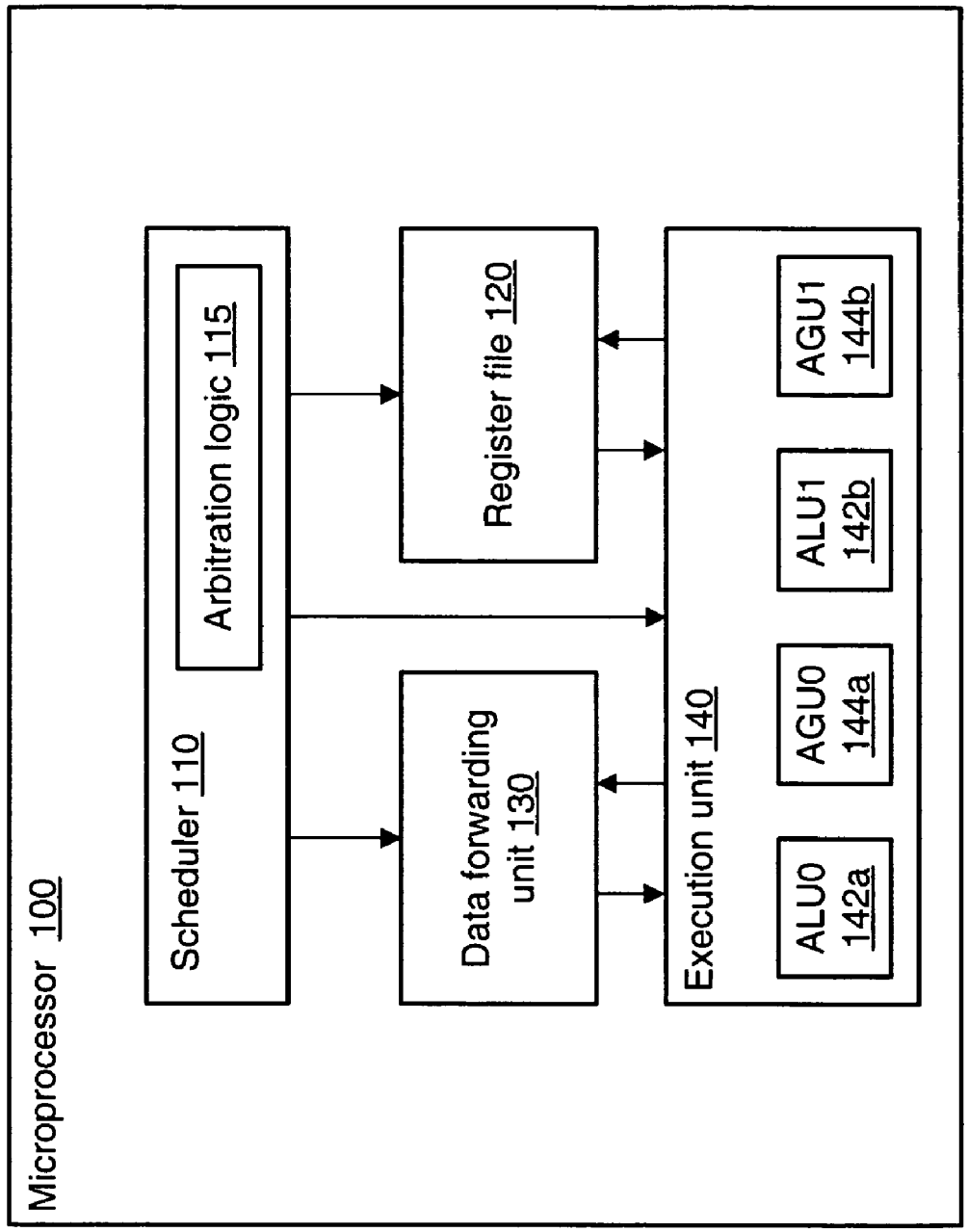
FIG. 1 is a block diagram illustrating one embodiment of an exemplary microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of an exemplary microprocessor 100 is shown. Microprocessor 100 is configured to execute instructions stored in a system memory (not shown in FIG. 1). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor that implements the x86 architecture such as an Athlon™ processor, for example. However, other embodiments are contemplated which include other types of microprocessors.

In the illustrated embodiment, microprocessor 100 includes a scheduler 110 which may include an arbitration logic 115. Scheduler 110 is coupled to receive operations dispatched from an instruction control unit (not shown) and to issue operations to an execution unit 140. Scheduler 110 is also coupled to control a register file 120 and a data forwarding unit 130. Register file 120 and data forwarding unit 130 are coupled to provide operands to execution unit 140. Execution unit 140 may include a plurality of functional units such as arithmetic logic units (ALU) 142 and address generation units (AGU) 144. In the illustrated embodiment, execution unit 140 includes ALU0 142a, ALU1 142b, AGU0 144a, and AGU1 144b; however, other embodiments are contemplated that include other types and numbers of functional units. Results generated by execution unit 140 may be stored to register file 120 and/or sent to data forwarding unit 130 to be used as operands for subsequently scheduled operations.

Scheduler 110 may include one or more scheduler units (not shown, e.g. an integer scheduler unit and a floating point scheduler unit). It is noted that as used herein, a scheduler refers to a device that detects when operations are ready for execution and issues ready operations to one or more functional units within an execution unit. For example, a reservation station may be a scheduler. Each scheduler 110 may be capable of holding operation information (e.g., bit encoded execution bits as well as operand tags and/or immediate data) for several pending operations awaiting issue to an execution unit 140. Each scheduler 110 may store the age of each scheduled operation and may use the age to determine when to issue ready operations to functional units. Each scheduler 110 may monitor issued operations and results available in register file 120 and data forwarding unit 130 in order to determine what operand values are available to be read by execution unit 140, as well as the location of those operand values. In some embodiments, each scheduler 110 may provide operand value storage and/or data forwarding value storage. Further, in some embodiments, each scheduler 110 may be associated with a dedicated one of register file 120, data forwarding unit 130, and execution unit 140. In other embodiments, a single scheduler 110 may issue operations to more than one of register file 120, data forwarding unit 130, and execution unit 140.

In the illustrated embodiment, scheduler 110 includes arbitration logic 115. Arbitration logic 115 may be control logic configured to control selection of specific operands within register file 120, data forwarding unit 130, and execution unit 140 as described in further detail below. In other embodiments, it is contemplated that the function of arbitration logic 115 may be included within another unit, such as the register file, for example.

Register file 120 may include a plurality of entries (not shown) that may be used to store operands and results corresponding to the operations performed by execution unit 140. In the illustrated embodiment, a single register file 120 is provided. In other embodiments, multiple register files 120 may be provided (e.g. an integer register file and a floating point register file, or a register file for each execution unit 140). In the illustrated embodiment, register file 120 may be directed by scheduler 110 to read out specific entries containing values to supply as operands to execution unit 140, and to write results provided by execution unit 140 into specific entries. As discussed in further detail below in conjunction with the description of FIG. 2, register file 120 may provide a limited number of read and write ports through which to read out and write back entries, respectively.

In some embodiments, reading from and writing to register file 120 may require several processor clock cycles to complete, depending on such factors as the number of register file entries, internal configuration, and physical location. To improve performance, microprocessor 100 includes a data forwarding unit 130. In one embodiment, data forwarding unit 130 may include multiple-entry buffer or queue structures (not shown) to store recently produced results provided by execution unit 140 that may be likely to be used again as operands by execution unit 140 prior to being written into register file 120. In another embodiment, data forwarding unit 130 may consist of multiplexer logic (not shown) configured to select particular results provided by execution unit 140 to be sent directly back to execution unit 140 as operands. In the illustrated embodiment, a single data forwarding unit 130 is provided. In other embodiments, multiple data forwarding units 130 may be provided (e.g. data forwarding units corresponding to integer and floating point operations, or a data forwarding unit for each execution unit 140). In the illustrated embodiment, data forwarding unit 130 may be directed by scheduler 110 to read out specific entries containing values to supply as operands to execution unit 140, and to write results provided by execution unit 140 into specific entries.

In one embodiment, execution unit 140 may include a functional unit such as an integer arithmetic logic unit (ALU), for example. It is noted that as used herein, a functional unit refers to a device configured to perform one or more operations such as addition, subtraction, multiplication, shifts, rotates, logical operations, and branch operations. In other embodiments, microprocessor 100 may be a superscalar processor, in which case execution unit 140 may include multiple functional units. In addition, one or more floating-point units (not shown) may also be included to accommodate floating-point operations, and one or more functional units may be address generation units (AGUs) configured to perform address generation arithmetic for load and store memory operations. In the illustrated embodiment, execution unit 140 includes two arithmetic logic units ALU0 and ALU1 designated 142a and 142b, respectively. In addition, execution unit 140 also includes two address generation units AGU0 and AGU1 designated 144a and 144b, respectively. As described further below in conjunction with the description of FIG. 3 and FIG. 4, each of ALU 142 and AGU 144 receives a number of input operands and produces a result.

Referring now to FIG. 2, a block diagram of one embodiment of register file 120 is shown. Components corresponding to those in FIG. 1 are numbered identically for clarity and simplicity. In addition to the plurality of entries (not shown) for storing data described above, register file 120 includes a plurality of write ports 122 and a plurality of read ports 124. In the illustrated embodiment, the plurality of write ports 122 includes four write ports designated "wr0," "wr1," "wr2," and "wr3," and the plurality of read ports 124 includes six read ports designated "rd0," "rd1," "rd2," "rd3," "rd4," and "rd5." Each write port may be configured to write one value, for example a 32-bit integer, into one of the plurality of entries in a given execution cycle. Each read port may be configured to read one value, for example a 32-bit integer, from one of the plurality of entries in a given execution cycle. Thus, in the illustrated embodiment, at most four different result values may be simultaneously written and six different operand values may be simultaneously read in a given execution cycle. Other embodiments are contemplated that may include different numbers and combinations of read and write ports and corresponding limitations on simultaneous numbers of read and write values. Additionally, it is contemplated that in some embodiments read and write ports may support different sizes of data values or combinations of different sizes of data values.

It is noted that as used herein, an execution cycle refers to the basic unit of time during which a functional unit may receive a new operation to perform. In one embodiment, an execution cycle may correspond to an execution pipe stage. In another embodiment, an execution cycle may correspond to one cycle of a particular processor clock signal. In yet another embodiment, an execution cycle may correspond to a portion of a particular processor clock signal, such as a clock phase, for example.

It is further noted that in one embodiment, a functional unit may receive a new operation to perform and may begin performing that operation during the same execution cycle. In another embodiment, a functional unit may receive a new operation to perform during one execution cycle and may begin performing that operation during a subsequent execution cycle. In such an embodiment, the functional unit may be non-pipelined, in which case the functional unit may either receive a new operation or perform a previously received operation, but not both, during a given execution cycle. Alternatively, the functional unit may be pipelined, in which case the functional unit may receive a new operation and simultaneously perform a previously received operation during a given execution cycle.

In FIG. 3 a block diagram of one embodiment of ALU 142 is shown and in FIG. 4 a block diagram of one embodiment of AGU 144 is shown. Referring collectively now to FIG. 3 and FIG. 4, ALU 142 includes a plurality of ALU input ports 146, and AGU 144 includes a plurality of AGU input ports 146. In the illustrated embodiments, the plurality of ALU input ports 146 includes three input ports designated "src1," "src2," and "flags," and the plurality of AGU input ports 148 includes three input ports designated "base," "index," and "store data." Each of ALU 142 and AGU 144 includes a single result port designated "result."

In a given execution cycle, ALU 142 may be configured to perform an operation on the operands presented to it via ALU input ports 146, producing a result on its result port. For example, ALU 142 may be configured to perform an arithmetic operation that combines the values on the "src1" and "src2" input ports to generate a result under the control of the value on the "flags" input port. Similarly, in a given execution cycle, AGU 144 may be configured to perform an operation on the operands presented to it via ALU input ports 146, producing a result on its result port. For example, AGU 144 may be configured to perform a store address generation operation that combines the values on the "base" and "index" input ports to generate a store address result, while receiving the data to be stored on the "store data" input port. It is contemplated that other embodiments of ALU 142 and AGU 144 may have differing numbers of input and result ports and may be configured to perform different operations.

Referring collectively to FIG. 1 through FIG. 4, in the illustrated embodiment of execution unit 140, the four functional units ALU0 142a, AGU0 144a, ALU1 142b, and AGU 142b each may provide three input ports and one result port. If all four functional units were configured to operate concurrently, in a given execution cycle the four functional units could collectively operate on a maximum of twelve input operands and could collectively produce a maximum of four results. However, register file 120 may provide only six read ports and four write ports, a number insufficient to provide the maximum number of operands on which the functional units could collectively operate in a given execution cycle. Thus, arbitration logic 115 may be configured to allocate the limited number of read ports 124 of register file 120 to the functional units of execution unit 140.

Figure 5:
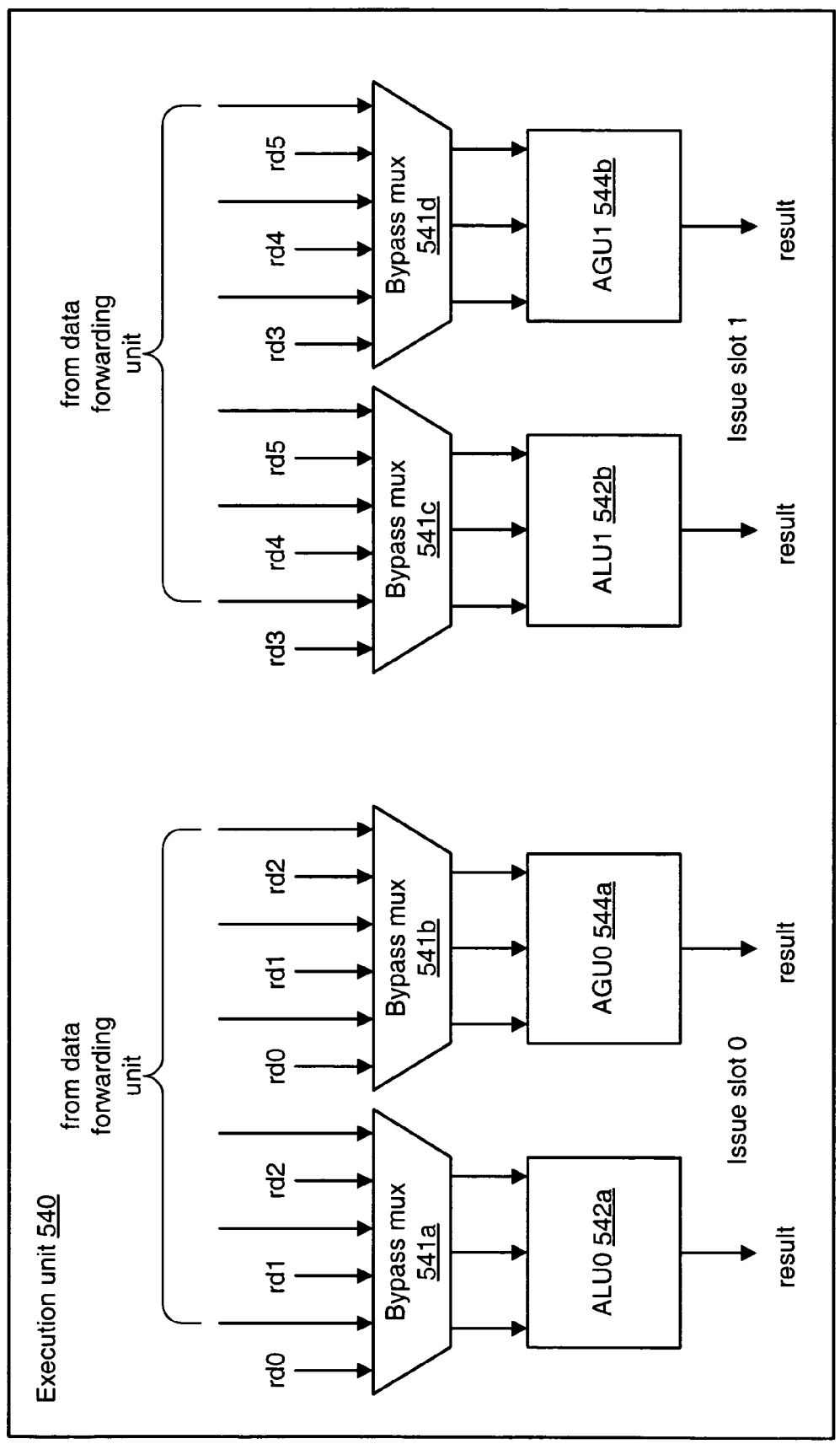
FIG. 5 is a block diagram illustrating one embodiment of an execution unit.

Turning now to FIG. 5, one embodiment of execution unit 540 is shown. Execution unit 540 may be illustrative of execution unit 140 of FIG. 1. In the illustrated embodiment, execution unit 540 includes a plurality of functional units ALU0 542a, AGU0 544a, ALU1 542b, and AGU1 544b. ALU0 542a and ALU1 542b may be illustrative of ALU 142 of FIG. 3. AGU0 544a and AGU1 544b may be illustrative of AGU 144 of FIG. 4. The result ports of the plurality of functional units are coupled to write ports 122 of register file 120 (not shown in FIG. 5). Execution unit 540 also includes a plurality of bypass multiplexers 541a-d coupled to the functional units. It is noted that the terms multiplexer and mux may be used interchangeably. In the illustrated embodiment, ALU0 542a is coupled to bypass mux 541a, AGU0 544a is coupled to bypass mux 541b, ALU1 542b is coupled to bypass mux 541c, and AGU1 544b is coupled to bypass mux 541d. Each bypass mux 541 is coupled to a subset of read ports 124 of register file 120 (not shown in FIG. 5) as well as to data forwarding unit 130 (not shown in FIG. 5).

In one embodiment, each bypass mux 541 may be configured to provide a port corresponding to each input port of each associated functional unit. In the illustrated embodiment, for each input port of each associated functional unit, each corresponding port of bypass mux 541 may be configured to select between a specific read port of register file 120 and an input from data forwarding unit 130 under the direction of scheduler 110 (not shown in FIG. 5). In other embodiments, bypass mux 541 may have additional inputs from which to select other values, for example immediate data from the instruction stream (not shown). In one embodiment, bypass mux 541a may be configured to select between register file 120 read ports "rd0," "rd1," and "rd2" and one or more inputs from data forwarding unit 130 for each of ALU0 542a input ports "src1," "src2," and "flags," respectively. In one embodiment, bypass mux 541b may be configured to select between register file 120 read ports "rd0," "rd1," and "rd2" and one or more inputs from data forwarding unit 130 for each of AGU0 544a input ports "base," "index," and "store data," respectively. In one embodiment, bypass mux 541c may be configured to select between register file 120 read ports "rd3," "rd4," and "rd5" and one or more inputs from data forwarding unit 130 for each of ALU 1542b input ports "src1," "src2," and "flags," respectively. In one embodiment, bypass mux 541d may be configured to select between register file 120 read ports "rd3," "rd4," and "rd5" and one or more inputs from data forwarding unit 130 for each of AGU1 544b input ports "base," "index," and "store data," respectively. It is noted that in alternative embodiments, data forwarding unit 130 may provide a single value common to several bypass mux ports, one or more individual values corresponding to each bypass mux port, or any combination thereof. It is further noted that alternative embodiments are contemplated in which different numbers of bypass mux ports, functional units, and register file read ports are arranged in different configurations.

As described in greater detail below in conjunction with the description of FIG. 6, arbitration logic 115 may allocate read ports 124 to the functional units within execution unit 540 on the basis of issue slots. As used herein, an issue slot refers to a heterogeneous grouping of functional units that forms the unit of allocation of a resource, such as a portion of read ports 124. Each functional unit within execution unit 540 may correspond to one of a plurality of issue slots. In the illustrated embodiment, ALU0 542a and AGU0 544a both correspond to issue slot 0, and ALU1 542b and AGU1 544b both correspond to issue slot 1. In other embodiments, it is contemplated that a different number of issue slots may be provided, and it is further contemplated that different types and numbers of functional units may correspond to any issue slot. Arbitration logic 115 may be configured to allocate one portion of read ports 124 to issue slot 0, and a second portion of read ports 124 to issue slot 1. In the illustrated embodiment, read ports "rd0," "rd1," and "rd2" are allocated to issue slot 0, and read ports "rd3," "rd4," and "rd5" are allocated to issue slot 1. However, other embodiments are contemplated in which different numbers of ports may be allocated to different issue slots.

It is noted that in any given execution cycle, the operand requirements of each functional unit within a given issue slot may be met by the combination of read ports 124 allocated to that issue slot by arbitration logic 115 and the values provided by data forwarding unit 130. Thus, in the illustrated embodiment, ALU0 542a, AGU0 544a, ALU1 542b, and AGU1 544b may operate concurrently in a given execution cycle. As described in greater detail in conjunction with the description of FIG. 6, arbitration logic 115 may be configured to resolve conflicts that may occur if, in a given execution cycle, the operand requirements of each functional unit within a given issue slot cannot be met by the combination of read ports 124 allocated to that issue slot and the values provided by data forwarding unit 130.

Figure 6:
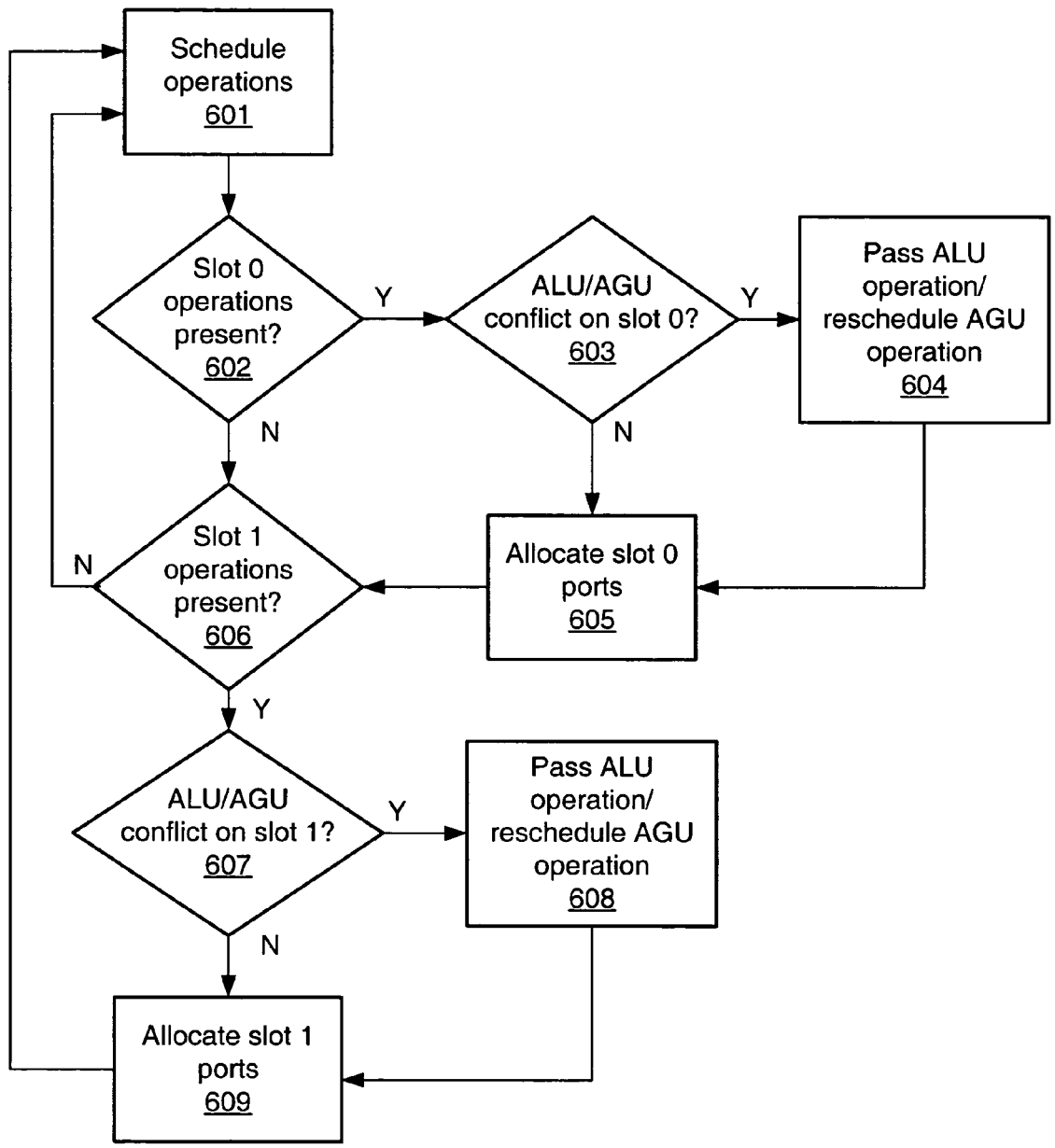
FIG. 6 is a flow diagram describing the operation of one embodiment of arbitration logic in a processor.

FIG. 6 illustrates a flow diagram describing the operation of an embodiment of arbitration logic in a processor. Referring collectively to FIG. 1 through FIG. 6, operation begins in block 601 where scheduler 110 schedules operations to be executed in a particular execution cycle in the functional units of execution unit 540. Arbitration logic 115 may examine the operations scheduled in a particular execution cycle to determine whether operations destined for functional units in issue slot 0 are present in scheduler 110 (block 602).

If issue slot 0 operations are present, arbitration logic 115 may examine the operations and the availability of operands for the operations to determine whether there is a conflict between ALU0 542a and AGU0 544a (block 603). If an operation has been scheduled for only one of ALU0 542a or AGU0 544a, there is no conflict on issue slot 0. Arbitration logic 115 may then allocate ports by directing the relevant bypass mux 541a or 541b to select operands from read ports "rd0," "rd1," "rd2" and/or data forwarding unit 130, as indicated by operand availability information in scheduler 110 (block 605). Similarly, if operations are scheduled for both ALU0 542a and AGU0 544a, and the operand requirements of both operations can be met by the combination of read ports "rd0," "rd1," "rd2" and the values provided by data forwarding unit 130, there is no conflict on issue slot 0. Arbitration logic 115 may then allocate ports by directing bypass muxes 541a and 541b to select operands from read ports "rd0," "rd1," "rd2" and/or data forwarding unit 130, as indicated by operand availability information in scheduler 110 (block 605).

Returning to block 603, if operations are scheduled for both ALU0 542a and AGU0 544a, and the operand requirements of both operations cannot be met by the combination of read ports "rd0," "rd1," "rd2" and the values provided by data forwarding unit 130, a conflict on issue slot 0 may occur. For example, each of ALU0 542a and AGU0 544a may require three unique operand values available only in register file 120. In this case, arbitration logic 115 may allow the operation scheduled for ALU0 542a to pass, while directing scheduler 110 to reschedule the operation destined for AGU0 544a to be executed at a later time (block 604). Arbitration logic 115 may then allocate ports to ALU0 542a by directing bypass mux 541a to select operands from read ports "rd0," "rd1," "rd2" and/or data forwarding unit 130, as indicated by operand availability information in scheduler 110 (block 605). In an alternative embodiment, arbitration logic 115 may select the AGU0 544a operation to pass while directing the rescheduling of the ALU0 542a operation.

Once arbitration logic 115 has allocated ports to issue slot 0 operations (block 605), or if there were no issue slot 0 operations scheduled in the execution cycle (block 602), arbitration logic 115 may examine the scheduled operations to determine whether operations destined for functional units in issue slot 1 are present in scheduler 110 (block 606). If no issue slot 1 operations are present, port allocation for the execution cycle is complete and arbitration logic 115 may await further scheduling of operations by scheduler 110 (block 601).

Returning to block 606, if issue slot 1 operations are present, operation proceeds in a manner similar to that for issue slot 0. Specifically, arbitration logic 115 may examine the operations and the availability of operands for the operations to determine whether there is a conflict between ALU1 542b and AGU1 544b (block 607). If an operation has been scheduled for only one of ALU1 542b or AGU1 544b, there is no conflict on issue slot 1. Arbitration logic 115 may then allocate ports by directing the relevant bypass mux 541c or 541d to select operands from read ports "rd3," "rd4," "rd5" and/or data forwarding unit 130, as indicated by operand availability information in scheduler 110 (block 609). Similarly, if operations are scheduled for both ALU1 542b and AGU1 544b, and the operand requirements of both operations can be met by the combination of read ports "rd3," "rd4," "rd5" and the values provided by data forwarding unit 130, there is no conflict on issue slot 1. Arbitration logic 115 may then allocate ports by directing bypass muxes 541c and 541d to select operands from read ports "rd3," "rd4," "rd5" and/or data forwarding unit 130, as indicated by operand availability information in scheduler 110 (block 609).

Returning to block 607, if operations are scheduled for both ALU1 542b and AGU1 544b, and the operand requirements of both operations cannot be met by the combination of read ports "rd3," "rd4," "rd5" and the values provided by data forwarding unit 130, a conflict on issue slot 1 may occur. For example, each of ALU1 542b and AGU1 544b may require three unique operand values available only in register file 120. In this case, arbitration logic 115 may allow the operation scheduled for ALU1 542b to pass, while directing scheduler 110 to reschedule the operation destined for AGU1 544b to be executed at a later time (block 608). Arbitration logic 115 may then allocate ports to ALU1 542b by directing bypass mux 541c to select operands from read ports "rd3," "rd4," "rd5" and/or data forwarding unit 130, as indicated by operand availability information in scheduler 110 (block 609). In an alternative embodiment, arbitration logic 115 may select the AGU1 544b operation to pass while directing the rescheduling of the ALU1 542b operation.

Once arbitration logic 115 has allocated ports to issue slot 1 operations (block 609), port allocation for the execution cycle is complete and arbitration logic 115 may await further scheduling of operations by scheduler 110 (block 601). It is noted that in other embodiments, arbitration logic 115 may be configured to examine and allocate issue slots 0 and 1 in a different order, or to examine and allocate issue slots 0 and 1 simultaneously.

It is noted that arbitration logic 115 may allocate ports to a scheduled operation at any time prior to the actual execution of the scheduled operation in its scheduled functional unit. In one embodiment, arbitration logic 115 may allocate ports to operations scheduled for a given execution cycle during that same execution cycle, just before the functional units receive operands and begin performing their respective scheduled operations. In an alternative embodiment, arbitration logic 115 may allocate ports for a given execution cycle several execution cycles in advance.

Figure 7:
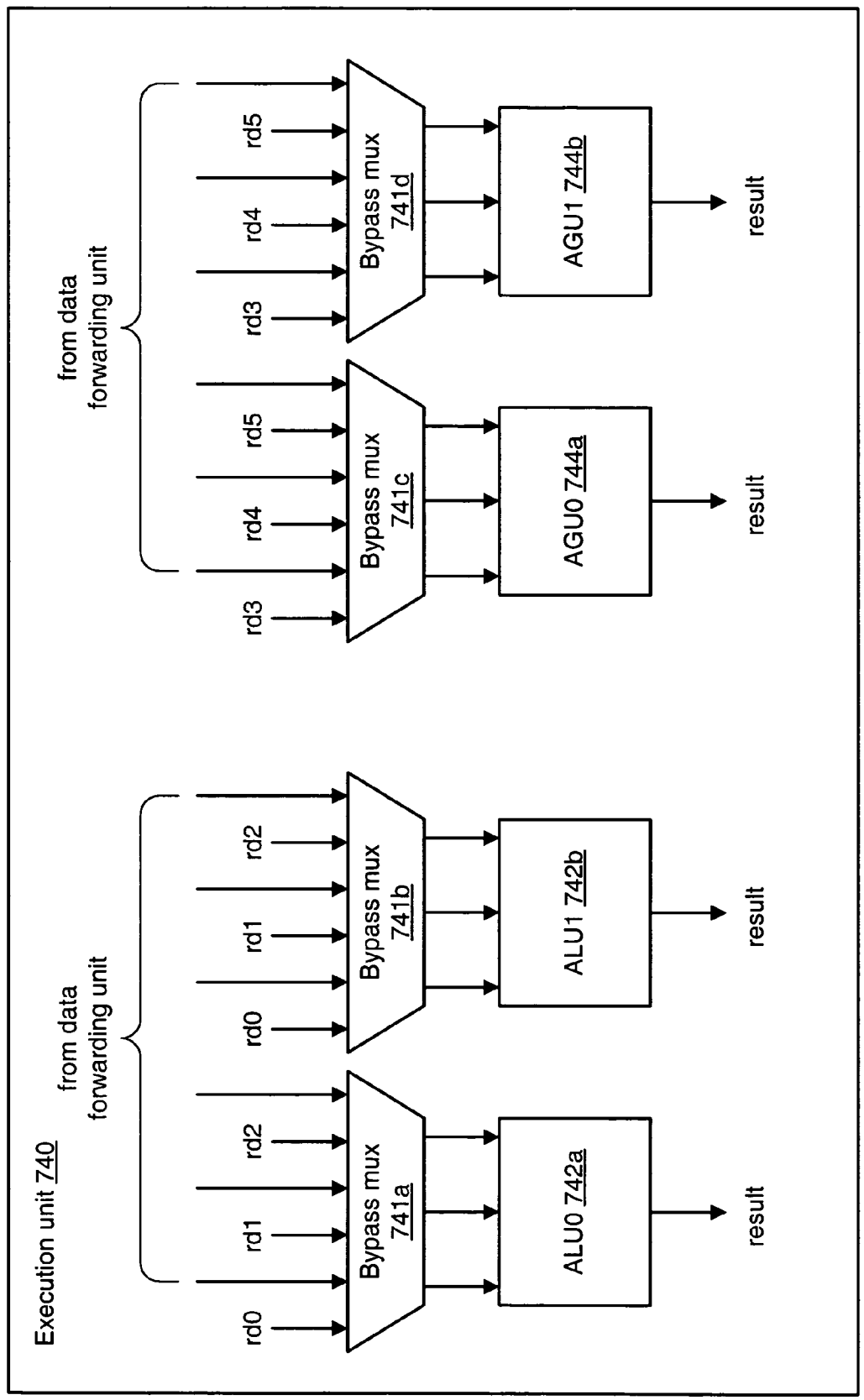
FIG. 7 is a block diagram illustrating another embodiment of an execution unit.

Turning now to FIG. 7, one embodiment of execution unit 740 is shown. Execution unit 740 may be illustrative of execution unit 140 of FIG. 1. In the illustrated embodiment, execution unit 740 includes a plurality of functional units ALU0 742a, AGU0 744a, ALU1 742b, and AGU1 744b. ALU0 742a and ALU1 742b may be illustrative of ALU 142 of FIG. 3. AGU0 744a and AGU1 744b may be illustrative of AGU 144 of FIG. 4. The result ports of the plurality of functional units are coupled to write ports 122 of register file 120 (not shown in FIG. 7). Execution unit 740 also includes a plurality of bypass multiplexers 741a-d coupled to the functional units. In the illustrated embodiment, ALU0 742a is coupled to bypass mux 741a, ALU1 742b is coupled to bypass mux 741b, AGU0 744a is coupled to bypass mux 741c, and AGU1 744b is coupled to bypass mux 741d. Each bypass mux 741 is coupled to a subset of read ports 124 of register file 120 (not shown in FIG. 7) as well as to data forwarding unit 130 (not shown in FIG. 7).

In one embodiment, each bypass mux 741 may be configured to provide a port corresponding to each input port of each associated functional unit. In the illustrated embodiment, for each input port of each associated functional unit, each corresponding port of bypass mux 741 may be configured to select between a specific read port of register file 120 and an input from data forwarding unit 130 under the direction of scheduler 110 (not shown in FIG. 7). In other embodiments, bypass mux 741 may have additional inputs from which to select other values, for example immediate data from the instruction stream (not shown). In one embodiment, bypass mux 741a may be configured to select between register file 120 read ports "rd0," "rd1," and "rd2" and one or more inputs from data forwarding unit 130 for each of ALU0 742a input ports "src1," "src2," and "flags," respectively. In one embodiment, bypass mux 741b may be configured to select between register file 120 read ports "rd0," "rd1," and "rd2" and one or more inputs from data forwarding unit 130 for each of AGU0 744a input ports "base," "index," and "store data," respectively. In one embodiment, bypass mux 741c may be configured to select between register file 120 read ports "rd3," "rd4," and "rd5" and one or more inputs from data forwarding unit 130 for each of ALU1 742b input ports "src1," "src2," and "flags," respectively. In one embodiment, bypass mux 741d may be configured to select between register file 120 read ports "rd3," "rd4," and "rd5" and one or more inputs from data forwarding unit 130 for each of AGU1 744b input ports "base," "index," and "store data," respectively. It is noted that in alternative embodiments, data forwarding unit 130 may provide a single value common to several bypass mux ports, one or more individual values corresponding to each bypass mux port, or any combination thereof. It is further noted that alternative embodiments are contemplated in which different numbers of bypass mux ports, functional units, and register file read ports are arranged in different configurations.

It is noted that the illustrated embodiment is similar in structure and function to execution unit 540 of FIG. 5, with the following differences: ALU1 742b is coupled to bypass mux 741b, and AGU0 744a is coupled to bypass mux 741c.

As described in greater detail below in conjunction with the description of FIG. 8, arbitration logic 115 may allocate read ports 124 to the functional units within execution unit 740 on the basis of functional unit types. As used herein, a functional unit type refers to a homogeneous grouping of functional units that forms the unit of allocation of a resource, such as a portion of read ports 124. Each functional unit within execution unit 740 may correspond to one of a plurality of functional unit types. In the illustrated embodiment, ALU0 742a and ALU1 742b both correspond to the ALU functional unit type, and AGU0 744a and AGU1 744b both correspond to the AGU functional unit type. In other embodiments, it is contemplated that a different number of functional unit types may be provided, and it is further contemplated that different numbers of functional units may correspond to any functional unit type. Arbitration logic 115 may be configured to allocate one portion of read ports 124 to the ALU functional unit type, and a second portion of read ports 124 to the AGU functional unit type. In the illustrated embodiment, read ports "rd0," "rd1," and "rd2" are allocated to the ALU functional unit type, and read ports "rd3," "rd4," and "rd5" are allocated to the AGU functional unit type. However, other embodiments are contemplated in which different numbers of ports may be allocated to different issue slots.

It is noted that in any given execution cycle, the operand requirements of each functional unit within a given functional unit type may be met by the combination of read ports 124 allocated to that functional unit type by arbitration logic 115 and the values provided by data forwarding unit 130. Thus, in the illustrated embodiment, ALU0 742a, ALU1 742b, AGU0 744a, and AGU1 744b may operate concurrently in a given execution cycle. As described in greater detail in conjunction with the description of FIG. 8, arbitration logic 115 may be configured to resolve conflicts that may occur if, in a given execution cycle, the operand requirements of each functional unit within a given functional unit type cannot be met by the combination of read ports 124 allocated to that issue slot and the values provided by data forwarding unit 130.

Figure 8:
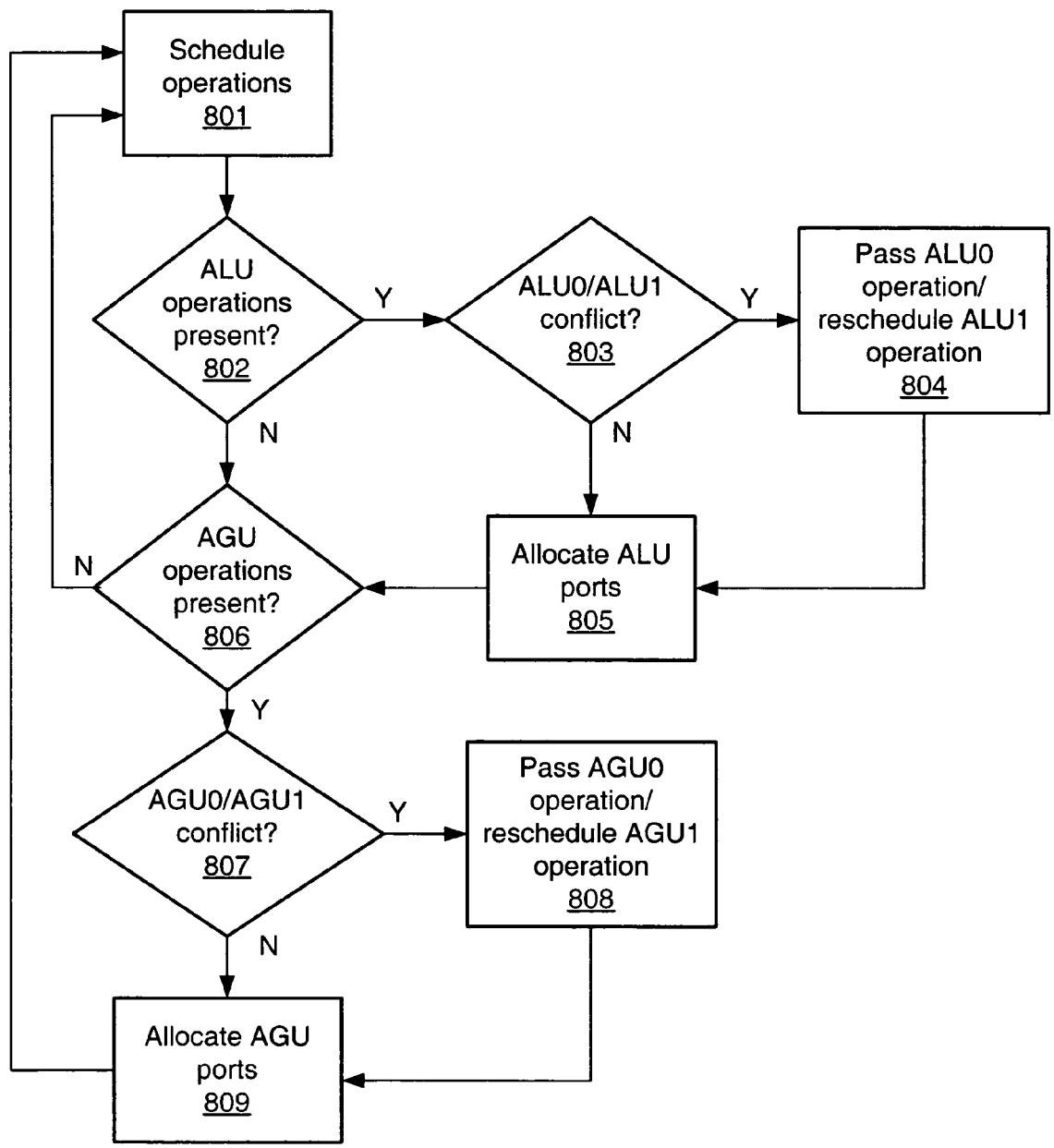
FIG. 8 is a flow diagram describing the operation of another embodiment of arbitration logic in a processor.

FIG. 8 illustrates a flow diagram describing the operation of an embodiment of arbitration logic in a processor. Referring collectively to FIG. 1 through FIG. 4, FIG. 7, and FIG. 8, operation begins in block 801 where scheduler 110 schedules operations to be executed in a particular execution cycle in the functional units of execution unit 740. Arbitration logic 115 may examine the operations scheduled in a particular execution cycle to determine whether operations scheduled destined for functional units in the ALU functional unit type are present in scheduler 110 (block 802).

If ALU functional unit type operations are present, arbitration logic 115 may examine the operations and the availability of operands for the operations to determine whether there is a conflict between ALU0 742a and ALU1 742b (block 803). If an operation has been scheduled for only one of ALU0 742a or ALU1 742b, there is no conflict on the ALU functional unit type. Arbitration logic 115 may then allocate ports by directing the relevant bypass mux 741a or 741b to select operands from read ports "rd0," "rd1," "rd2" and/or data forwarding unit 130, as indicated by operand availability information in scheduler 110 (block 805). Similarly, if operations are scheduled for both ALU0 742a and ALU1 742b, and the operand requirements of both operations can be met by the combination of read ports "rd0," "rd1," "rd2" and the values provided by data forwarding unit 130, there is no conflict on the ALU functional unit type. Arbitration logic 115 may then allocate ports by directing bypass muxes 741a and 741b to select operands from read ports "rd0," "rd1," "rd2" and/or data forwarding unit 130, as indicated by operand availability information in scheduler 110 (block 805).

Returning to block 803, if operations are scheduled for both ALU0 742a and ALU1 742b, and the operand requirements of both operations cannot be met by the combination of read ports "rd0," "rd1," "rd2" and the values provided by data forwarding unit 130, a conflict on the ALU functional unit type may occur. For example, each of ALU0 742a and ALU1 742b may require three unique operand values available only in register file 120. In this case, arbitration logic 115 may allow the operation scheduled for ALU0 742a to pass, while directing scheduler 110 to reschedule the operation destined for ALU1 742b to be executed at a later time (block 804). Arbitration logic 115 may then allocate ports to ALU0 742a by directing bypass mux 741a to select operands from read ports "rd0," "rd1," "rd2" and/or data forwarding unit 130, as indicated by operand availability information in scheduler 110 (block 805). In an alternative embodiment, arbitration logic 115 may select the ALU0 742a operation to pass while directing the rescheduling of the ALU1 742b operation.

Once arbitration logic 115 has allocated ports to ALU functional unit type operations (block 805), or if there were no ALU functional unit type operations scheduled in the execution cycle (block 802), arbitration logic 115 may examine the scheduled operations to determine whether operations destined for functional units in the AGU functional unit type are present in scheduler 110 (block 806). If no AGU functional unit type operations are present, port allocation for the execution cycle is complete and arbitration logic 115 may await further scheduling of operations by scheduler 110 (block 801).

Returning to block 806, if AGU functional unit type operations are present, operation proceeds in a manner similar to that for ALU functional unit type operations. Specifically, arbitration logic 115 may examine the operations and the availability of operands for the operations to determine whether there is a conflict between AGU0 744a and AGU1 744b (block 807). If an operation has been scheduled for only one of AGU0 744a or AGU1 744b, there is no conflict on the AGU functional unit type. Arbitration logic 115 may then allocate ports by directing the relevant bypass mux 741c or 741d to select operands from read ports "rd3," "rd4," "rd5" and/or data forwarding unit 130, as indicated by operand availability information in scheduler 110 (block 809). Similarly, if operations are scheduled for both AGU0 744a and AGU1 744b, and the operand requirements of both operations can be met by the combination of read ports "rd3," "rd4," "rd5" and the values provided by data forwarding unit 130, there is no conflict on the AGU functional unit type. Arbitration logic 115 may then allocate ports by directing bypass muxes 741c and 741d to select operands from read ports "rd3," "rd4," "rd5" and/or data forwarding unit 130, as indicated by operand availability information in scheduler 110 (block 809).

Returning to block 807, if operations are scheduled for both AGU0 744a and AGU1 744b, and the operand requirements of both operations cannot be met by the combination of read ports "rd3," "rd4," "rd5" and the values provided by data forwarding unit 130, a conflict on the AGU functional unit type may occur. For example, each of AGU0 744a and AGU1 744b may require three unique operand values available only in register file 120. In this case, arbitration logic 115 may allow the operation scheduled for AGU0 744a to pass, while directing scheduler 110 to reschedule the operation destined for AGU1 744b to be executed at a later time (block 808). Arbitration logic 115 may then allocate ports to AGU0 744a by directing bypass mux 741c to select operands from read ports "rd3," "rd4," "rd5" and/or data forwarding unit 130, as indicated by operand availability information in scheduler 110 (block 809). In an alternative embodiment, arbitration logic 115 may select the AGU1 744b operation to pass while directing the rescheduling of the AGU0 744a operation.

Once arbitration logic 115 has allocated ports to the AGU functional unit type operations (block 809), port allocation for the execution cycle is complete and arbitration logic 115 may await further scheduling of operations by scheduler 110 (block 801). It is noted that in other embodiments, arbitration logic 115 may be configured to examine and allocate the ALU and AGU functional unit types in a different order, or to examine and allocate the ALU and AGU functional unit types simultaneously.

Figure 9:
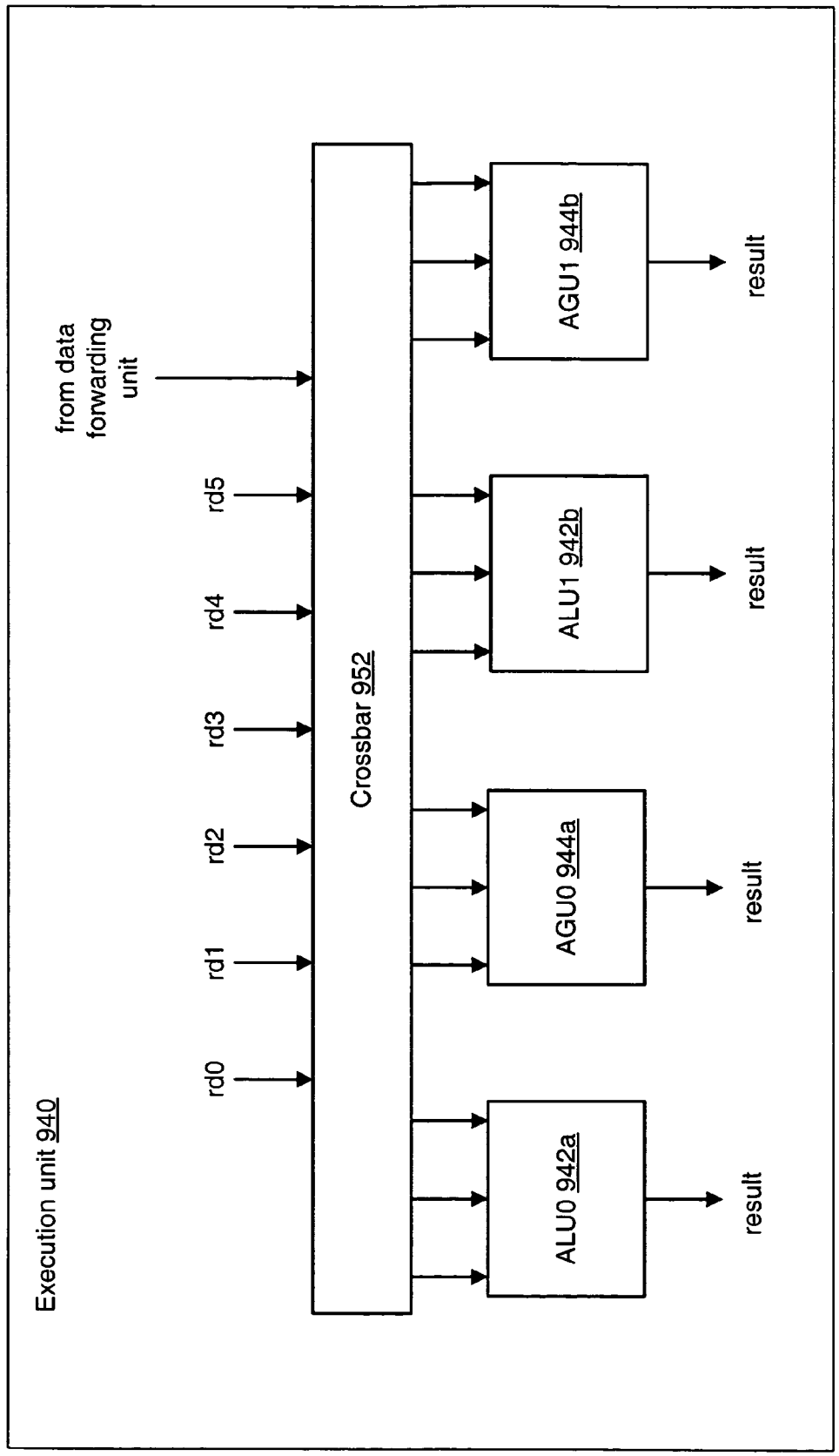
FIG. 9 is a block diagram illustrating another embodiment of an execution unit.

Turning now to FIG. 9, one embodiment of execution unit 940 is shown. Execution unit 940 may be illustrative of execution unit 140 of FIG. 1. In the illustrated embodiment, execution unit 940 includes a plurality of functional units ALU0 942a, AGU0 944a, ALU1 942b, and AGU1 944b. ALU0 942a and ALU1 942b may be illustrative of ALU 142 of FIG. 3. AGU0 944a and AGU1 944b may be illustrative of AGU 144 of FIG. 4. The result ports of the plurality of functional units are coupled to write ports 122 of register file 120 (not shown in FIG. 9). Execution unit 940 also includes a crossbar 952 coupled to the functional units ALU0 942a, AGU0 944a, ALU1 942b, and AGU1 944b. Crossbar 952 is also coupled to read ports 124 of register file 120 (not shown in FIG. 9) as well as to data forwarding unit 130 (not shown in FIG. 9).

In the illustrated embodiment, crossbar 952 may provide an output port corresponding to each input port of each functional unit to which crossbar 952 is coupled, as well as an input port corresponding to each of the plurality of read ports 124 and each of one or more inputs from data forwarding unit 130. In addition, crossbar 952 may be configured to provide a path from each input port to any single output port concurrently, under the direction of scheduler 110 (not shown in FIG. 9). Thus, crossbar 952 may provide a means to selectively provide a value from any of read ports 142 or one or more inputs from data forwarding unit 130 to any single input port of functional units ALU0 942a, AGU0 944a, ALU1 942b, and AGU1 944b.

In another embodiment, crossbar 952 may be configured to provide a path from each input port to more than one output port concurrently, under the direction of scheduler 110 (not shown in FIG. 9). In such an embodiment, crossbar 952 may provide a means for multiple functional units to share a single one of read ports 142 or inputs from data forwarding unit 130 when multiple functional units require the same operand value.

It is noted that in other embodiments, crossbar 952 may have additional inputs from which to select other values, for example immediate data from the instruction stream (not shown). It is further noted that alternative embodiments are contemplated in which different numbers of crossbar input and output ports, functional units, and register file read ports are arranged in different configurations.

Figure 10:
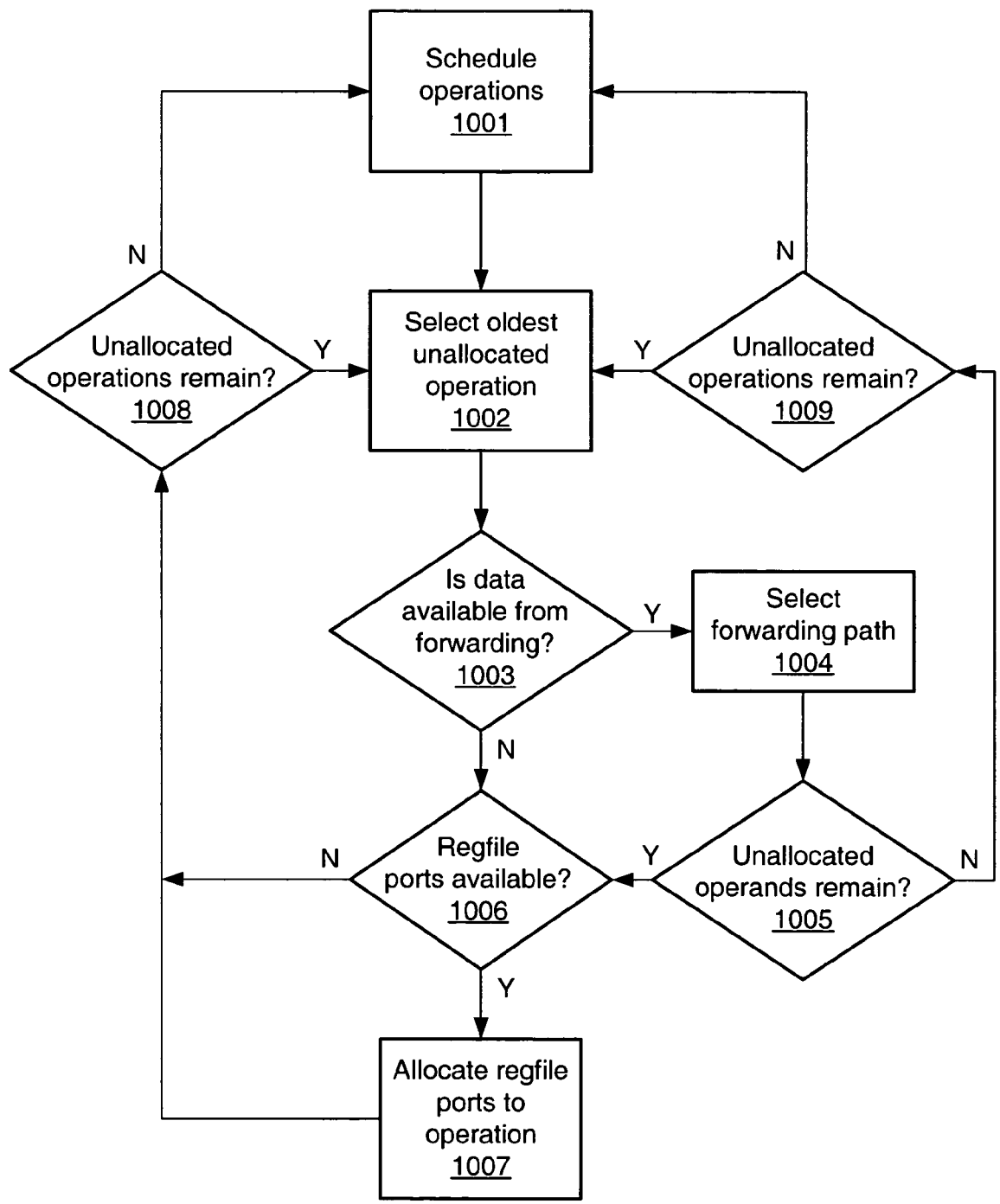
FIG. 10 is a flow diagram describing the operation of another embodiment of arbitration logic in a processor.

As described in further detail in conjunction with the description of FIG. 10, in one embodiment arbitration logic 115 (not shown in FIG. 9) may allocate read ports 124 to the functional units within execution unit 940 based on the age of pending operations scheduled by scheduler 110 (not shown in FIG. 9). It is noted that other embodiments are contemplated in which alternative criteria may be used to allocate read ports 124 to the functional units within execution unit 940, such as the type of a pending operation or the number of dependencies on a pending operation, for example.

It is noted that in any given execution cycle, the operand requirements of each functional unit within execution unit 940 may be met by the combination of read ports 124 allocated to that functional unit by arbitration logic 115 and the values provided by data forwarding unit 130. Thus, in the illustrated embodiment, ALU0 942a, AGU0 944a, ALU1 942b, and AGU1 944b may operate concurrently in a given execution cycle. As described in greater detail in conjunction with the description of FIG. 10, arbitration logic 115 may be configured to resolve conflicts that may occur if, in a given execution cycle, the operand requirements of each functional unit cannot be met by the combination of read ports 124 allocated to that issue slot and the values provided by data forwarding unit 130.

FIG. 10 illustrates a flow diagram describing the operation of an embodiment of arbitration logic in a processor. Referring collectively to FIG. 1 through FIG. 4, FIG. 9, and FIG. 10, operation begins in block 1001 where scheduler 110 schedules operations to be executed in a particular execution cycle in the functional units of execution unit 940. Arbitration logic 115 may examine the operations scheduled in a particular execution cycle to determine the oldest scheduled operation to which ports have not been allocated, also referred to herein as an unallocated scheduled operation, and to select this operation for port allocation (block 602). As noted above, other embodiments of arbitration logic 115 are contemplated in which alternative criteria may be used to select a scheduled operation.

After selecting a scheduled operation for port allocation, arbitration logic 115 may determine whether any operand of the selected operation is available from data forwarding unit 130, as indicated by operand availability information in scheduler 110 (block 1003). If any operand of the selected operation is available from data forwarding unit 130, for each such operand, arbitration logic 115 may direct crossbar 952 to select the appropriate input from data forwarding unit 130 to be routed to the appropriate input port of the functional unit of execution unit 940 corresponding to the selected scheduled operation (block 1004).

After determining operand availability from data forwarding unit 130 for the selected operation, arbitration logic 115 may determine whether any operand of the selected operation is still unallocated (block 1005). If no unallocated operands remain for the selected operation (i.e., the selected operation's operands were all available from data forwarding unit 130), port allocation for the selected operation is complete. Arbitration logic 115 may determine whether any scheduled operations remain that have not yet been allocated ports (block 1009). If no unallocated scheduled operations remain, port allocation for the particular execution cycle is complete, and arbitration logic 115 may await further scheduling of operations by scheduler 110 (block 1001). Returning to block 1009, if unallocated scheduled operations remain, operation returns to block 1002, in which arbitration logic 115 may select the oldest remaining unallocated scheduled operation for port allocation.

If unallocated operands remain for the selected operation (block 1005), or no operand of the selected operation is available from data forwarding unit 130 (block 1003), arbitration logic 115 may determine whether a sufficient number of read ports 142 are available to allocate to the unallocated operands of the selected operation (block 1006). If a sufficient number of read ports 142 are available, for each unallocated operand, arbitration logic 115 may direct crossbar 952 to select the appropriate port from read ports 142 to be routed to the appropriate input port of the functional unit of execution unit 940 corresponding to the selected scheduled operation (block 1007).

After ports have been allocated to the selected operation, or if there were not a sufficient number of read ports 142 to allocate (block 1006), arbitration logic 115 may determine whether any scheduled operations remain that have not yet been allocated ports (block 1008). If no unallocated scheduled operations remain, port allocation for the particular execution cycle is complete, and arbitration logic 115 may await further scheduling of operations by scheduler 110 (block 1001). Returning to block 1008, if unallocated scheduled operations remain, operation returns to block 1002, in which arbitration logic 115 may select the oldest remaining unallocated scheduled operation for port allocation.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
a plurality of functional units, wherein said plurality of functional units is configured to collectively operate on a maximum number of operands in a given execution cycle, wherein said plurality of functional units is grouped into a plurality of distinct issue slots, and wherein each of said plurality of issue slots includes at least two functional units of different types;
a register file configured to provide a number of read ports that is insufficient to provide said maximum number of operands to said plurality of functional units in said given execution cycle; and
an arbitration logic coupled to allocate said read ports of said register file for use by selected functional units during said given execution cycle, wherein said arbitration logic is configured to allocate portions of said read ports to functional units included in each of said plurality of issue slots, and wherein said portions are respectively associated with said issue slots.

2. The microprocessor as recited in claim 1 further comprising a scheduler configured to assign ones of a plurality of operations to respective ones of said plurality of functional units and to store an age of each of said plurality of operations, wherein said arbitration logic is further configured to allocate a first portion of said read ports to a given one of said plurality of issue slots including a given respective functional unit dependent upon said age of a corresponding operation assigned to said given respective functional unit.

3. The microprocessor as recited in claim 1 further comprising a data forwarding unit configured to store results produced by said plurality of functional units, wherein said arbitration logic is configured to allocate said results to said selected functional units during said given execution cycle prior to allocating said read ports of said register file.

4. The microprocessor as recited in claim 1, wherein said arbitration logic is further configured to allocate a single read port of said register file to one or more of said selected functional units.

5. A method comprising:
configuring a plurality of functional units to collectively operate on a maximum number of operands in a given execution cycle, wherein said plurality of functional units is grouped into a plurality of distinct issue slots, and wherein each of said plurality of issue slots includes at least two functional units of different types;
providing a number of read ports that is insufficient to provide said maximum number of operands to said plurality of functional units in said given execution cycle; and
allocating portions of said read ports of said register file to functional units included in each of said plurality of issue slots for use during said given execution cycle, wherein said portions are respectively associated with said issue slots.

6. The method as recited in claim 5 further comprising:
assigning ones of a plurality of operations to respective ones of said plurality of functional units;
storing an age of each of said plurality of operations; and
allocating a first portion of said read ports to a given one of said plurality of issue slots including a given respective functional unit dependent upon said age of a corresponding operation assigned to said given respective functional unit.

7. The method as recited in claim 5 further comprising:
storing results produced by said plurality of functional units in a data forwarding unit; and
allocating said results to said selected functional units during said given execution cycle prior to allocating said read ports of said register file.

8. The method as recited in claim 5 further comprising allocating a single read port of said register file to one or more of said selected functional units.

9. A system comprising:
a system memory including a plurality of addressable locations; and
a microprocessor coupled to said system memory and comprising:
  a plurality of functional units, wherein said plurality of functional units is configured to collectively operate on a maximum number of operands in a given execution cycle, wherein said plurality of functional units is grouped into a plurality of distinct issue slots, and wherein each of said plurality of issue slots includes at least two functional units of different types;
  a register file configured to provide a number of read ports that is insufficient to provide said maximum number of operands to said plurality of functional units in said given execution cycle; and
  an arbitration logic coupled to allocate said read ports of said register file for use by selected functional units during said given execution cycle, wherein said arbitration logic is configured to allocate portions of said read ports to functional units included in each of said plurality of issue slots, and wherein said portions are respectively associated with said issue slots.

10. The microprocessor as recited in claim 1, wherein said plurality of functional units includes arithmetic logic units and address generation units, and wherein each of said issue slots includes a respective one of said arithmetic logic units and a respective one of said address generation units.

11. The microprocessor as recited in claim 1, wherein said arbitration logic is further configured to allocate a given one of said portions of said read ports respectively associated with a given one of said plurality of issue slots to functional units included in said given issue slot in response to a scheduler scheduling operations to be executed in one or more functional units included in said given issue slot.

12. The microprocessor as recited in claim 11 further comprising a data forwarding network configured to provide operands, wherein in response to said scheduler scheduling at least two operations to be respectively executed in at least two functional units included in said given issue slot during said given execution cycle, said arbitration logic is further configured to determine whether operand requirements of said at least two operations can be met by a combination of said given portion of said read ports and operands provided by said data forwarding network.

13. The microprocessor as recited in claim 12, wherein in response to determining that operand requirements of said at least two operations cannot be met by a combination of said given portion of said read ports and operands provided by said data forwarding network, said arbitration logic is further configured to direct said scheduler to reschedule at least one of said at least two operations and to allocate said given portion of said read ports to one or more other ones of said at least two operations.

14. The microprocessor as recited in claim 13, wherein said arbitration logic is further configured to allocate said given portion of said read ports to an oldest one of said at least two operations.

15. The microprocessor as recited in claim 1, wherein each of said portions of said read ports includes an equal number of said read ports.

16. The microprocessor as recited in claim 1, wherein at least two of said portions of said read ports include dissimilar numbers of said read ports.

17. The method as recited in claim 5, wherein said plurality of functional units includes arithmetic logic units and address generation units, and wherein each of said issue slots includes a respective one of said arithmetic logic units and a respective one of said address generation units.

18. The method as recited in claim 5, wherein said allocating said portions of said read ports further comprises allocating a given one of said portions of said read ports respectively associated with a given one of said plurality of issue slots to functional units included in said given issue slot in response to scheduling operations to be executed in one or more functional units included in said given issue slot.

19. The method as recited in claim 18, further comprising:
in response to at least two operations being scheduled to be respectively executed in at least two functional units included in said given issue slot during said given execution cycle, determining whether operand requirements of said at least two operations can be met by a combination of said given portion of said read ports and operands provided by a data forwarding network.

20. The method as recited in claim 19, further comprising:
in response to determining that operand requirements of said at least two operations cannot be met by a combination of said given portion of said read ports and operands provided by said data forwarding network, directing that at least one of said at least two operations be rescheduled and allocating said given portion of said read ports to one or more other ones of said at least two operations.

21. The method as recited in claim 20, further comprising allocating said given portion of said read ports to an oldest one of said at least two operations.

22. The method as recited in claim 5, wherein each of said portions of said read ports includes an equal number of said read ports.

23. The method as recited in claim 5, wherein at least two of said portions of said read ports include dissimilar numbers of said read ports.

* * * * *